United States Patent [19]

Drew

[11] Patent Number: 5,144,986
[45] Date of Patent: Sep. 8, 1992

[54] ONE WAY FLOW DEVICE

[75] Inventor: Terrence M. Drew, Boulder, Colo.

[73] Assignee: Alden Laboratories, Inc., Boulder, Colo.

[21] Appl. No.: 675,699

[22] Filed: Mar. 27, 1991

[51] Int. Cl.$^5$ .............................................. F16K 15/14
[52] U.S. Cl. ..................................... 137/843; 137/851; 137/852
[58] Field of Search ............... 137/843, 846, 852, 855, 137/859, 851

[56] References Cited

U.S. PATENT DOCUMENTS

| 2,404,578 | 7/1946 | Liska . | |
| 2,589,716 | 3/1952 | Marsh . | |
| 2,926,692 | 3/1960 | Zillman et al. . | |
| 3,057,373 | 10/1962 | Bragg . | |
| 3,401,719 | 9/1968 | Rosser | 137/859 X |
| 3,804,113 | 4/1974 | Garcea | 137/859 X |
| 4,230,149 | 10/1980 | Worthen et al. . | |
| 4,708,167 | 11/1987 | Koyanagi | 137/846 X |
| 4,961,516 | 10/1990 | Nakamura . | |
| 4,966,185 | 10/1990 | Schram | 137/859 X |

Primary Examiner—Robert G. Nilson
Attorney, Agent, or Firm—Sheridan, Ross & McIntosh

[57] ABSTRACT

A one-way flow device (10) for use in a passageway (18) is provided. The device (10) comprises first (12) and second (14) walls attached together to form a passageway (18). A flexible diaphragm (20) having at least one orifice (24) extends across the passageway (18). The diaphragm (20) flexes between open and closed positions responsive to flow conditions in the passageway (18). In the open position, the orifice (24) is exposed, allowing fluid flow. In the closed position, the orifice (24) is sealed by the first sheet (12), substantially preventing fluid flow.

9 Claims, 2 Drawing Sheets

ONE WAY FLOW DEVICE

TECHNICAL FIELD OF THE INVENTION

This invention relates in general to devices for regulating fluid flow in a system and in particular to a device for allowing one-way flow through a conduit.

BACKGROUND OF THE INVENTION

In many applications, it is advantageous to construct conduits, such as tubes or channels, from rigid or flexible materials. Flexible conduits have proved popular in part because they are relatively simple and inexpensive to produce, particularly if constructed from sheet materials which can be heat sealed together at longitudinal edges thereof to form the conduit, and are deformable to facilitate storage or deployment of the conduit in compact or irregularly shaped areas. Because such conduits are economically produced, they are particularly suitable for applications where it is desirable to dispose of the conduit after use. For example, in medical applications, it is desirable that conduits be disposed of after contact with drugs or body fluids.

A problem encountered in this regard is the lack of one-way flow devices suitable for use in both rigid and flexible conduit applications. Desirably, such a device should be simple and inexpensive to construct so that it may be economically employed in connection with a disposable apparatus. In addition, it is desirable that the device continuously and automatically respond to conditions in the conduit, without the need for manual implementation, particularly if the device is deployed in a relatively inaccessible region. Finally, it is desirable that the one-way flow device be constructed without the sliding or rotating parts associated with some known valves, as such parts may stick in an open or closed position. As can be appreciated, the latter concern may be of critical importance in medical applications.

One known one-way flow device is disclosed in U.S. Pat. No. 2,926,692. The one-way flow device allows discharge of fluid from a rigid core. A flexible sealing member, which is attached to the core, supports a closure button. When fluid flows from the core through an aperture, the flexible member opens outwardly to permit fluid flow. However, when the flow from the core ceases, the flexible member collapses allowing the button to cover the aperture, the flexible member and button thereby preventing backflow into the core.

Another flow regulating device is disclosed in U.S. Pat. No. 3,057,373. The device shuts off fluid flow through a line when the flow rate reaches a predetermined value. In an open position, the free end of a leaf spring overlies an aperture. The aperture is closed, thereby shutting off flow through the line, by deflection of the leaf spring occasioned by a pressure drop associated with an increased flow rate through the line.

Another known flow regulating device is disclosed in U.S. Pat. No. 4,230,149. The device regulates the flow rate through a line to maintain a substantially constant flow rate. A cantilevered reed is disposed with a free end adjacent to an aperture through which fluid passes. The reed deflects in response to changes in the differential pressure thereacross associated with changes in the flow rate through the line, thereby changing the size of the opening through which the fluid flows and regulating flow through the line.

However, these patents do not disclose a simple one-way flow device for use in conduits constructed from rigid pipes or flexible sheet materials. Thus, there is a need for such a device which is simple and inexpensive to produce so that it may be economically employed in connection with a disposable apparatus. In addition, there is a need for such a device which continuously and automatically responds to conditions in the conduit. There is also a need for such a device that functions without the sliding or rotating parts associated with some known valves.

SUMMARY OF THE INVENTION

In accordance with the present invention a one-way flow device for use in passageways and a method for using it are provided. The device is simple and inexpensive to produce, responds continuously and automatically to conditions in the passageway, and functions without sliding or rotating parts.

The invention is applicable to rigid or flexible bodies comprising a fluid passageway, e.g., conduits, tubes, and channels. In addition, the invention may be incorporated into or interconnected with an apparatus as an input or discharge passageway body for the apparatus. Thus, although the invention is described below with respect to specific embodiments thereof, the invention is not limited to such embodiments.

In accordance with one embodiment of the invention, a one-way flow device and method for use are provided. The device comprises a fluid passageway and a flexible diaphragm which extends across the passageway, dividing the passageway into upstream and downstream regions. At least one orifice is provided in the diaphragm which permits fluid flow through the diaphragm when the diaphragm is flexed by pressure in the downstream direction and substantially prevents flow through the diaphragm when the diaphragm is flexed by pressure in the upstream direction because the orifice is sealed by one of the walls of the passageway.

In accordance with a preferred embodiment of the invention, at least one orifice in the diaphragm is sealed by a first flexible wall when the pressure on a downstream side of the diaphragm is greater than the pressure on an upstream side. The at least one orifice is positioned closer to the first flexible wall than to a second flexible wall and is urged against the first flexible wall when the diaphragm flexes responsive to a differential pressure across the diaphragm. The diaphragm is attached to the first wall at a first point, and to the second wall at a second point, the first point being located upstream from the second point. When the pressure on the upstream side of the conduit is greater than the pressure on the downstream side, the orifice is exposed allowing fluid flow therethrough. The diaphragm and the first and second walls may be attached together at portions thereof in accordance with the invention by heat sealing for ease of construction.

It is an advantage of the present invention that a one-way flow device is provided which is simple and inexpensive to produce, in particular, when it is incorporated into a flexible passageway. It is a further advantage of the present invention that a diaphragm responds to conditions in a passageway by flexing between an open and a closed position, thereby eliminating the need for sliding or rotating parts and reducing the likelihood that the device will stick open or closed.

DETAILED DESCRIPTION OF THE INVENTION

Figure 1:
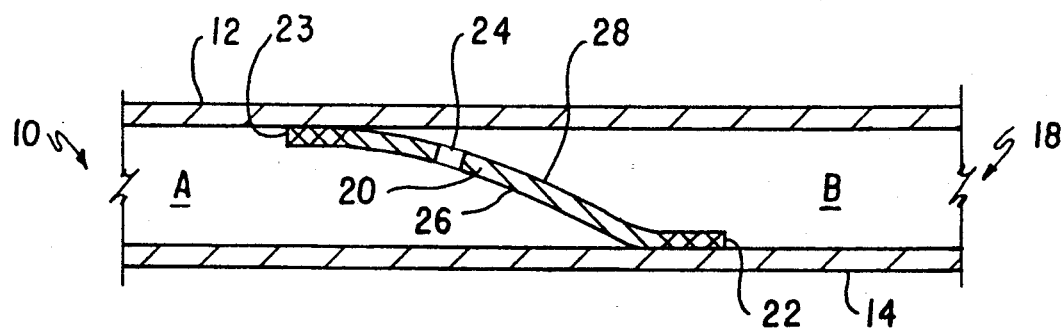
FIG. 1 is a side cross-sectional view of a one-way flow device in a relaxed position constructed in accordance with an embodiment of the present invention.
Figure 2:
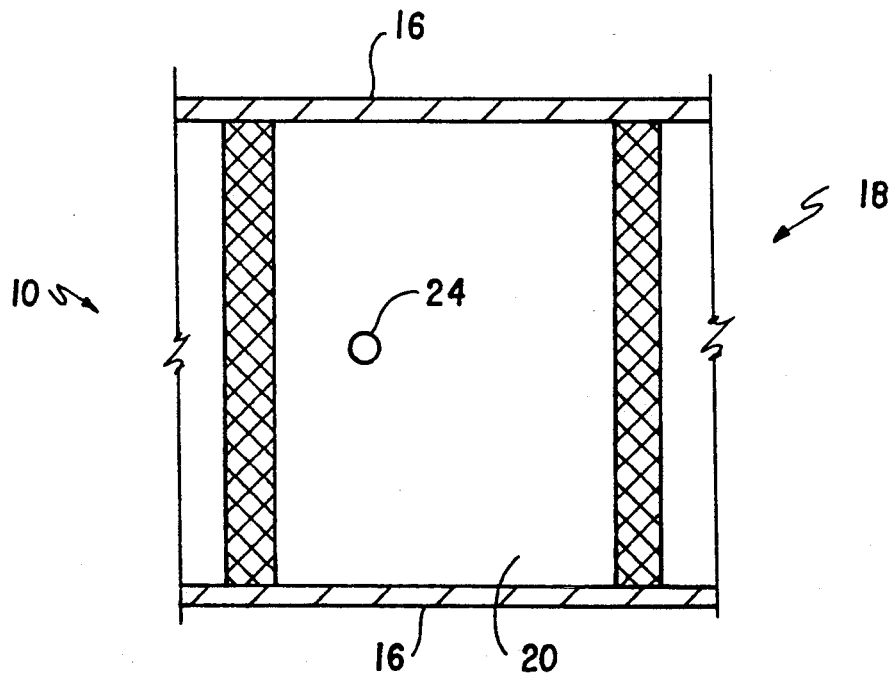
FIG. 2 is a top elevational view of the one-way flow device shown in FIG. 1.

In FIGS. 1-4, like items are identified by like and corresponding numerals for ease of reference. Referring to FIGS. 1 and 2, a side cross-sectional (FIG. 1) and a top elevational (FIG. 2) view of a one-way flow device, generally identified by the reference numeral 10, constructed in accordance with one embodiment of the present invention are shown in a relaxed position. The device 10 comprises a first wall 12 and a second wall 14 attached together at portions along longitudinal edges 16 thereof to form a passageway 18 such as a conduit. The walls 12, 14 comprise, for example, a sheet or thin film formed from flexible material, including polymeric material such as urethane. The walls 12, 14 may be attached together by any suitable technique, such as adhesive, heat sealing, or the like. Preferably, the walls 12, 14 are attached by heat sealing for ease of construction.

A flexible diaphragm 20 having a downstream side 26 and an upstream side 28 is attached to the first wall 12 at a downstream edge 23 and to the second wall 14 at an upstream edge 22 thereof, thereby defining an oblique surface relative to a longitudinal direction of the passageway 18. The diaphragm 20 comprises, for example, a sheet or thin film formed from a flexible material, such as a polymeric material. The walls 12, 14 and diaphragm 20 may be attached by any suitable means, but are preferably attached by heat sealing for ease of construction. The diaphragm 20 extends across the width of the passageway 18 dividing it into a downstream region A and an upstream region B.

At least one orifice 24 is provided in the diaphragm 20 to allow fluid communication between the downstream region A and the upstream region B when the device 10 is in an open position, as will be described in more detail below. The at least one orifice 24 may be sized and shaped to reduce the likelihood that the orifice will be clogged by particles carried by the fluid in operation. Thus, although the illustrated embodiment includes only one substantially circular orifice, it will be understood that one or a plurality of orifices of varying shapes and sizes may be utilized.

Figure 3:
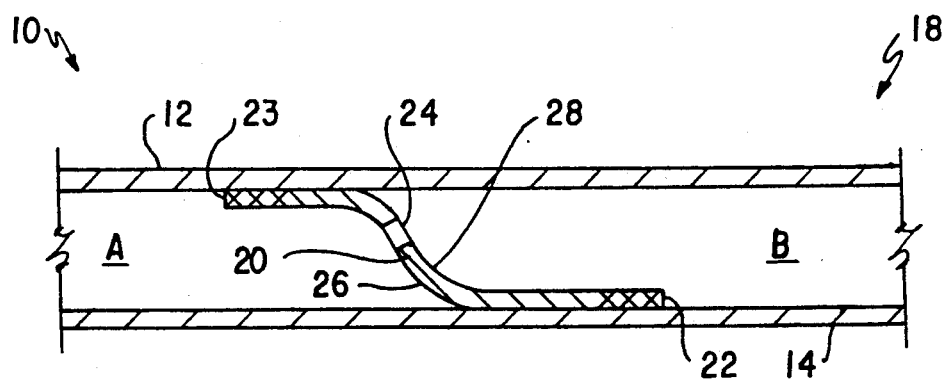
FIG. 3 is a side cross-sectional view of the one-way flow device of FIG. 1 in an open position.

Referring to FIG. 3, a side cross-sectional view of the device 10 is shown in an open position, i.e., allowing fluid flow. The device 10 allows fluid flow when the diaphragm 20 is flexed by pressure in the downstream direction. When the pressure exerted on the upstream side 28 of the diaphragm 20 from the upstream region B is greater than the pressure exerted on the downstream side 26 from the downstream region A, the diaphragm 20 flexes in a downstream direction from its relaxed position. For example, a downstream pressure is exerted on the diaphragm 20 when fluid flows against the upstream side 28 thereof. In the open position, the at least one orifice 24 is exposed to both the downstream region A and the upstream region B thereby allowing flow through the diaphragm 20.

Figure 4:
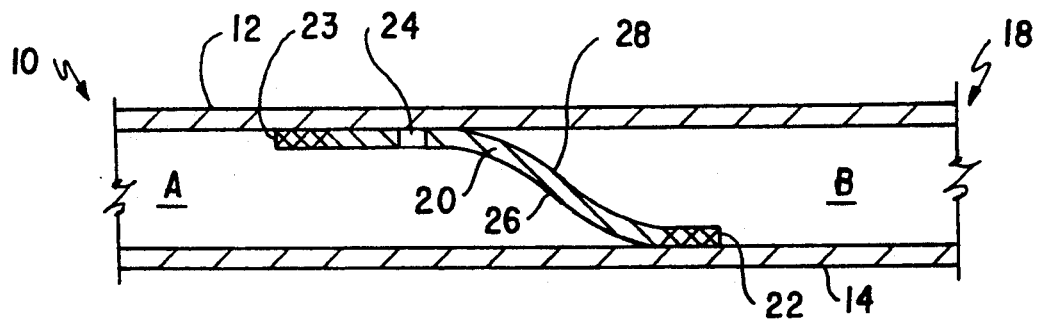
FIG. 4 is a side cross-sectional view of the one-way flow device of FIG. 1 in a closed position.

Referring to FIG. 4, a side cross-sectional view of the device 10 is shown in a closed position thereby substantially preventing fluid flow. The device 10 substantially prevents fluid flow when the diaphragm 20 is flexed by pressure in the upstream direction. The at least one orifice 24 is positioned closer to the first wall 12 than to the second wall 14. When the pressure exerted on the downstream side 26 of the diaphragm 20 from the downstream region A is greater than the pressure exerted on the upstream side 28 from the upstream region B, the diaphragm 20 flexes in an upstream direction from its relaxed position. The at least one orifice 24 is thereby urged against the first wall 12 and sealed by the first wall 12, substantially preventing fluid flow therethrough. In the illustrated embodiment, the orifice 24 is positioned in a portion of the diaphragm 20 which lays flat against the first wall 12 when the diaphragm 20 is flexed by pressure in the upstream direction thereby effecting the seal. For example, an upstream pressure is exerted on the diaphragm 20 when fluid flows against the downstream side 26 thereof.

In practice, the diaphragm 20 flexes responsive to differential pressure to move between an open and a closed position. When fluid flows downstream through the passageway 18 the orifice 24 permits fluid communication between the downstream region A and the upstream region B, allowing fluid flow in one direction. However, upstream flow or backflow of fluid is substantially prevented because the device 10 responds to upstream flow conditions by moving to a closed position wherein the orifice 24 is sealed by the first wall 12.

The device 10 has a number of advantages over prior art flow regulating devices. First, the device 10 is simple and inexpensive to produce. The device 10 may be constructed by simply heat sealing together portions of three flexible sheets to form the diaphragm 20 and the walls 12, 14. Thus, the device 10 is economical and suitable for applications where it is desirable to dispose of the device 10 after use. In addition, the device 10 opens and closes in response to changing flow conditions continuously and automatically. The device 10 is therefore suitable for deployment in relatively inaccessible regions. Finally, the device 10 is opened and closed by a flexing diaphragm 20 rather than through sliding or rotating parts, thereby reducing the likelihood that the device will stick in an open or closed position.

Although the device 10 may be advantageously employed in connection with a disposable apparatus, the device 10 is suitable for a broad range of disposable or non-disposable applications. For example, the device 10 may be employed in the output or input conduit of a plasma bag, colostomy bag, disposable or non-disposable container for drugs or nonmedical material, in pipes and other apparatus where one-way flow is desired. It is to be understood that the device 10 may be integrally incorporated into a desired apparatus or constructed separately and interconnected with the desired apparatus.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A one-way fluid flow device, comprising:
   first and second flexible sheets attached together at portions thereof to form a conduit;
   a diaphragm which flexes responsive to differential pressure thereacross, the diaphragm having an upstream and a downstream side; and
   at least one orifice in said diaphragm positioned so that it is urged against said first sheet when the pressure on said downstream side is greater than the pressure on said upstream side.

2. The device of claim 1, wherein fluid flow across said diaphragm is substantially prevented when the pressure on said downstream side of said diaphragm is greater than the pressure on the upstream side.

3. The device of claim 1, wherein said diaphragm is attached to said first sheet at a first point and to said second sheet at a second point, the first point being downstream from said second point.

4. The device of claim 1, wherein said sheets and said diaphragm comprise urethane.

5. The device of claim 1, wherein said at least one orifice is positioned closer to said first sheet than to said second sheet.

6. The device of claim 1, wherein said diaphragm and said first and second sheets are attached together at portions thereof by heat sealing.

7. A one-way fluid flow device, comprising:
   first and second flexible sheets attached together at portions thereof to form a longitudinal conduit;
   a third flexible sheet, having an upstream and a downstream side, attached to said first sheet at a first point and to said second sheet at a second point, the first point being longitudinally displaced from the second point; and
   at least one orifice in said third sheet positioned closer to said first sheet than to said second sheet, the at least one orifice allowing fluid flow therethrough when said third sheet is flexed by fluid flow against said upstream side thereof and sealing against said first sheet substantially preventing fluid flow therethrough when said third sheet is flexed by fluid flow against the downstream side thereof.

8. A one-way fluid flow device, comprising:
   a conduit comprising thin film;
   a flexible diaphragm comprising thin film positioned within said conduit and extending across a passageway defined by said conduit; and
   at least one orifice in said diaphragm which permits flow of fluid through said diaphragm when said diaphragm is flexed by pressure in a first direction and substantially prevents flow through said diaphragm when said diaphragm is flexed by pressure in a second direction.

9. A one-way fluid flow device, comprising:
   a conduit;
   a flexible diaphragm positioned within said conduit and extending across a passageway defined by said conduit, wherein said diaphragm and said conduit are attached together by heat sealing; and
   at least one orifice in said diaphragm which permits flow of fluid through said diaphragm when said diaphragm is flexed by pressure in a first direction and substantially prevents flow through said diaphragm when said diaphragm is flexed by pressure in a second direction.

* * * * *